(12) United States Patent
Croxford et al.

(10) Patent No.: US 11,956,619 B2
(45) Date of Patent: Apr. 9, 2024

(54) APPARATUS AND METHOD TO GENERATE AUDIO DATA

(71) Applicant: Arm Limited, Cambridge (GB)

(72) Inventors: Daren Croxford, Swaffham Prior (GB); Roberto Lopez Mendez, Cambridge (GB); Maxim Novikov, Manchester (GB)

(73) Assignee: Arm Limited, Cambridge (GB)

( * ) Notice: Subject to any disclaimer, the term of this patent is extended or adjusted under 35 U.S.C. 154(b) by 120 days.

(21) Appl. No.: 17/674,961

(22) Filed: Feb. 18, 2022

(65) Prior Publication Data
US 2023/0269553 A1    Aug. 24, 2023

(51) Int. Cl.
*H04S 7/00* (2006.01)
*G01B 11/22* (2006.01)
*G06V 20/20* (2022.01)

(52) U.S. Cl.
CPC .............. *H04S 7/303* (2013.01); *G01B 11/22* (2013.01); *G06V 20/20* (2022.01); *H04S 2400/11* (2013.01); *H04S 2400/15* (2013.01)

(58) Field of Classification Search
None
See application file for complete search history.

(56) References Cited

U.S. PATENT DOCUMENTS

| | | | |
|---|---|---|---|
| 10,142,760 B1 * | 11/2018 | Richman | H04S 7/303 |
| 2018/0139565 A1 * | 5/2018 | Norris | H04S 7/304 |
| 2020/0059750 A1 * | 2/2020 | Haurais | H04S 7/303 |
| 2020/0128233 A1 * | 4/2020 | Jannard | H04N 13/398 |
| 2022/0345842 A1 * | 10/2022 | Schembri | H04R 3/04 |
| 2022/0377482 A1 * | 11/2022 | Kumar B | G06F 3/04847 |

* cited by examiner

*Primary Examiner* — Qin Zhu
(74) *Attorney, Agent, or Firm* — Leveque Intellectual Property Law, P.C.

(57) ABSTRACT

There is provided a method and apparatus to generate audio data for a user, the apparatus comprising: an input device to receive one or more inputs derived from an environment in which the user is located; and a processor configured to obtain an acoustic profile for the environment based on or in response to the one or more inputs, synthesize audio data having audio characteristics corresponding to a sound source in the environment in accordance with the acoustic profile, and output the synthesized audio data for use by the user.

18 Claims, 9 Drawing Sheets

APPARATUS AND METHOD TO GENERATE AUDIO DATA

BACKGROUND

The present techniques relate to an apparatus and method to generate audio data for a user.

The techniques may be useful for improving a user's experience of audio in extended reality (XR) applications, where XR applications encompass virtual, augmented and mixed reality applications, also known as VR, AR and MR respectively.

BRIEF DESCRIPTION OF THE DRAWINGS

The present techniques are diagrammatically illustrated, by way of example, in the accompanying drawings, in which.

DETAILED DESCRIPTION

According to a first technique, an apparatus is provided as described below.

According to a second technique, a method is provided as described below.

According to a third technique, a non-transitory computer-readable storage medium is provided as described below.

Broadly speaking, embodiments of the present techniques provide for an improved audio user experience when using an XR application running on an XR apparatus or device.

Figure 1:
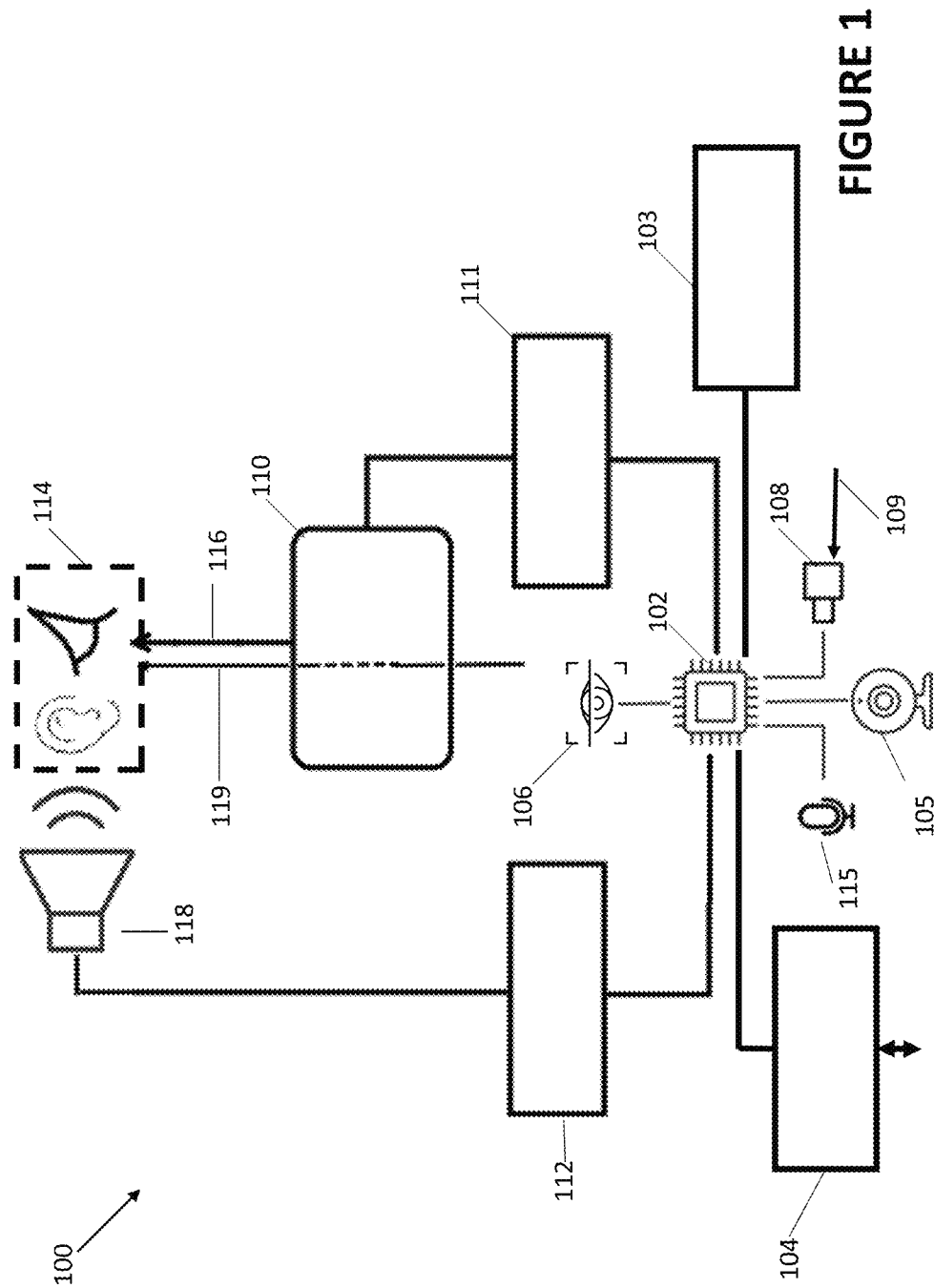
FIG. 1 schematically shows an apparatus according to an embodiment.

Referring to FIG. 1, an XR apparatus 100 is shown comprising a processor element 102 (hereafter "processor"). The apparatus may include more than one processor 102.

Such a processor may be, for example, a central processor unit (CPU), graphics processor unit (GPU), a system-on-chip, an application specific integrated circuit (ASIC), a neural processing unit (NPU), a digital signal processor (DSP), or the like.

In alternative embodiments the apparatus 100 may share processing with another apparatus. For example, the apparatus 100 may not comprise a processor or may only comprise very limited processing capabilities. The apparatus may be communicatively couplable to a separate apparatus (not shown) which accepts data from the apparatus 100, carries out a portion of the processing on its own hardware, and passes the processed data to the apparatus.

Apparatus may comprise storage 103 which may comprise, for example, volatile memory (e.g., SRAM, DRAM, etc.) and/or non-volatile memory (e.g., flash memory, non-volatile RAM, etc.). Although FIG. 1 depicts storage 103 in communication with processor (e.g., via a bus), the processor 102 may also include storage thereon (e.g., cache). For example, the storage 103 may store an XR application for execution by the processor and/or may store data used by the XR application.

The apparatus 100 may comprise communications circuitry 104 for communicating with a remote resource(s), such as other XR apparatus(es) or with other resources such as laptop computers, mobile phones or cloud services. Such communications circuitry 104 may include wired communications (e.g., Ethernet or Universal Serial Bus) or wireless communications (e.g., BLE, Bluetooth, ZigBee, Wi-Fi, and/or cellular 3G/4G).

The apparatus 100 may also comprise one or more input devices to receive receive/obtain input data from, for example, a user, the environment and/or other apparatuses/devices. The apparatus 100 may also comprise one or more output devices to output data for a user, to the environment and/or other apparatuses/devices.

For example, an input device may comprise an accelerometer (not shown) or gyroscope (not shown) to measure the movement of a user using the apparatus and/or to measure the movement of the apparatus itself.

The input may also comprise one or more cameras 105, which receive or capture information from the environment. The one or more cameras 105 may also be used to receive or capture one or more images (e.g., single frame, multiple frames or video stream) of a real object in the environment in which the user is using the XR apparatus and/or to capture the environment.

The processor may perform computer vision processing techniques on the one or more images to determine one or more object properties of the captured object and/or one more environment properties of the environment as will be described in greater detail below.

The apparatus may additionally or alternatively include an eye tracker input device 106 comprising one or more optical sensors, such as infrared or near-infrared sensors, which shine light at the user's eyes and receive light subsequently reflected from the user's eyes or the object. From the reflected light, a determination can be made of the positions and orientations of the user's eyes. From the determined positions and orientations of the user's eyes, it may be determined, for example by calculation using geometry, where the user is looking. Additionally, or alternatively, to the aforementioned one or more optical sensors, the eye-tracker device 106 may include a photo detector and a micro-electromechanical system (MEMS) to track the user's eyes, which uses less power than optical sensors. The positions and orientations of the user's eyes may be used by the processor 102 in a determination of eye vergence, from which the processor 102 may calculate a depth of an object at which the user is looking. The calculated depths may be used to generate/update a depth map of the environment in storage.

Apparatus 100 may further comprise a depth input sensor device 108. Such a depth sensor 108 may include one or more of a passive infrared (PIR) sensor, in which case the depth sensor 108 transmits light into the environment in which the user is using the XR apparatus and receives light 109 reflected by the environment, including light 109 reflected by an object at which a user is looking. Additionally, or alternatively the sensor may comprise a lidar or radar sensor where the light being transmitted and received by the depth sensor 108 may include visible light, or it may include electromagnetic radiation outside of the visible spectrum, such as infrared light, ultraviolet light, or radio waves. The data obtained from a depth sensor may be used to generate/update the depth map in storage.

Additionally, or alternatively to using a depth sensor to obtain depth data of an object, instead the method may comprise a camera to obtain one or more images of the environment and infer a depth of the object in the environment from the one or more images using machine learning. The images of the object may be obtained using one or more cameras, which receive or capture light from the environment containing the object and convert the captured light into the least one image of the object. At least one such image may be an RGB image, a greyscale image or an infrared image. Additionally, or alternatively, the depth sensor 108 may include two or more sensors (for example, two cameras) for parallax-type determination of depth, in which case the depth sensor 108 does not have to shine light into the environment.

Apparatus 100 further comprises one or more display screen 110. Such a display screen 110 may include a liquid crystal display (LCD), a light emitting diode (LED) display, an organic light emitting diode (OLED) display, an active-matrix organic light emitting diode (AMOLED) display, and the like.

A user 114 of the apparatus 100 is also shown to illustrate a path that light 116 from the screen 110 takes to the user's eyes 114. In embodiments the apparatus 100 may form part of a pair of glasses, helmet/visor, or similar wearable device (e.g. a head mountable display) such that the user's view of their surroundings is mostly or totally unobstructed, the screen 110 being transparent or semi-transparent so that the user can both receive light 119 from the real environment in which the user is using the XR apparatus through the screen 110 and see images (e.g. virtual objects) displayed on the screen 110. In further embodiments the apparatus may comprise a mobile phone or tablet, for example, mounted in a head mountable display. In the further embodiments, the mobile phone or tablet may or may not be in a head mountable display, i.e., the smart phone could be placed into a HMD. Alternatively, the user could look at the XR environment using a mobile phone display. The user may be wearing headphones that are controlled by the mobile phone.

Apparatus 100 further comprises a display controller 111 and an audio controller 112 in communication with the processor 102. Although only one display controller 111 and one audio controller 112 are depicted in FIG. 1, the apparatus may have more than one display controller 111 and/or audio controller 112.

The processor 102 instructs the display controller 111 to render images for display on the screen 110. The images may be, for example, images of a virtual reality environment comprising objects of the environment, such as walls, trees, furniture, and the like as required by the XR application. The images may be rendered by a graphics component of the processor 102 or they may be rendered by a dedicated GPU (not shown) that may be considered a component of the display controller or a separate piece of hardware in communication therewith.

The processor 102 can, using the eye-tracker device 106, determine a location a region (e.g. a segment such as a pixel or voxel)) at which a user's eyes are looking and then using depth information (e.g. as determined from the depth map or as calculated from the user's eye vergence) determine a position in the environment at which the user 114 is looking and render one or more virtual objects on the screen for the user as if the virtual object is at the position in the environment at which the user is looking. For example, the virtual object may be rendered to appear to interact with one or more real objects in the environment which the user can see through the screen (i.e., a virtual-to-real interaction).

In other embodiments, two or more virtual objects may be rendered to interact with each other on the screen (i.e., a virtual-to-virtual interaction). It will also be appreciated that real objects in the environment can also interact with each other in the environment (i.e., a real-to-real interaction).

An audio output device 118 (e.g., an in-ear or over the ear headset, bone conduction technology headset, or an implanted audio device etc.) provides audio data for the user 114 as described below. The term "audio data" may be used interchangeably herein with the term "audio" and "sound."

Although, for simplicity, only one audio output device 118 is depicted in FIG. 1, the apparatus 100 may comprise a plurality of such audio output devices 118 to provide a dual channel (stereo) sound experience or a multi-channel (surround) sound experience.

An audio input device 115 (e.g., a microphone) is provided to receive or capture audio data from the user and/or derived from the environment in which the user is using the apparatus 100, and the captured audio data used as inputs for processing by processor 102.

Although, for simplicity, only one audio input device 115 is depicted in FIG. 1, the apparatus 100 may comprise a plurality of such audio input devices to receive or capture audio data derived from different parts of the environment in which the user is located. Furthermore, the apparatus may receive audio inputs from the user (e.g., as voice inputs or via a user interface).

During the XR application, the processor 102 instructs the audio controller 112 to control the audio output device 118 to generate or synthesize audio data having particular audio characteristics for the user in accordance with the XR application (e.g., in accordance with interactions between objects in the environment and/or the environment itself). In embodiments the audio controller may use one or more head-related transfer functions (HRTF) for one or more of the user's ears when processing the audio data emitted to the user such that the synthesized audio data appears to the user as coming from a particular location in the environment.

In a real environment, the properties of real objects will affect the audio characteristics of audio data which a user hears resulting from real-to-real interactions. For example, the audio characteristics of audio data which the user hears resulting from a real wooden pole banging against a real metal door will be different to the audio characteristics of audio data which the user hears resulting from a real metal pole banging against the real metal door.

Furthermore, the environment properties of the real environment will also influence the audio characteristics of audio data which the user hears resulting from real-to-real interactions. For example, the audio characteristics of audio data which the user hears resulting from a real wooden pole banging against a real metal door in an empty room made of concrete walls and concrete floors will be different to the audio characteristics of audio data which the user hears resulting from the same real wooden pole banging against the same real metal door in the same room having carpeted walls and carpeted floors.

Thus, the acoustic profile of the real environment which determines the audio characteristics of real audio data heard by a user is dependent on the object properties and/or environment properties of the real environment.

In embodiments, the apparatus provides for determining the object properties of objects (real or virtual) in an environment and/or environment properties of the environment and synthesizing or generating audio data for a user based on or in response to the object properties of real/virtual objects therein and/or of the real/virtual environment properties thereof.

The object properties may include for example physical properties (e.g., height, width, length, depth of the object etc.) chemical properties (e.g., material properties), mechanical properties (e.g., hardness) and acoustic properties (e.g., sound absorption coefficient).

The environment properties may also include, for example, physical properties, mechanical properties, chemical properties, and acoustic properties.

When a user is using an XR application, the processor 102 determines, given the environment, how to position and orient one or more virtual objects to be rendered on the screen such that the virtual object appears to interact with real or virtual objects of the environment.

The processor 102 also determines, given the acoustic profile of the environment, how to synthesize audio data to provide a user with a realistic audio experience for the virtual audio data in the environment (i.e., sounds which emanate from a virtual source (e.g. a virtual-to real or virtual-to-virtual interaction)).

In an illustrative example, taking the virtual source rendered in the environment to be a ringing telephone, and the ringing telephone is rendered to be at a central location of the environment and at particular distance (e.g. three meters) from the user 114, the processor 102 may determine the audio characteristics of the virtual sound (e.g. the frequency, pitch, tone) from that ringing telephone and instruct the audio controller 112 to control the audio output device 118 to generate audio data having particular audio characteristics for the user, such that the user experiences the ringing telephone at the central position, three meters therefrom i.e. as if the virtual telephone was a real telephone.

To improve the audio experience, the apparatus takes into account the acoustic profile of the environment, which is dependent on the object properties of the objects (real or virtual) in the environment and/or the environment properties of the real environment, and synthesizes the audio data based on the acoustic profile such that the audio characteristics of the sound which the user hears will be dependent on the acoustic profile of the environment.

Therefore, the audio characteristics of the audio data which the user hears will be dependent on one or more object properties of virtual and/or real objects in the environment. Additionally, or alternatively, the audio characteristics of the audio data which the user hears will be dependent on one or more environment properties (virtual and/or real) of the environment.

In embodiments, the audio characteristics of virtual audio data may be different when the virtual source is not occluded or blocked by another object in comparison to when the virtual source is fully or partially occluded by another object (e.g., a real or virtual object).

Continuing the illustrative example of the ringing virtual telephone as a virtual source, when the ringing telephone is obscured or partially obscured (e.g. by being located in a virtual or real box) the processor 102 may determine how the audio characteristics of the audio data from that partially or fully obscured ringing telephone are affected by the object properties of the box (e.g. material type, height, width, thickness, absorption coefficient) and instruct the audio controller 112 to control the audio output device 118 to generate audio data having particular audio characteristics for the user based on or in response to the object properties of the box, such that the user experiences the partially or fully obscured virtual ringing telephone as affected by the object properties of the box.

The audio characteristics of the audio data emitted to the user for the virtual ringing telephone may be more greatly attenuated when the box is fully closed in comparison to when the box is only partially closed (i.e., where the virtual object is fully occluded vs partially occluded). In a further example, the audio characteristics of the audio data emitted to the user for the virtual ringing telephone may be more greatly attenuated or have different acoustic properties when the box is determined to be constructed from a first material (e.g. metal) in comparison to when the box is determined to be constructed from a second different material (e.g. cardboard).

As above, the apparatus 100 may take into account environment properties of the environment (e.g., real or virtual weather conditions; layout; location) when synthesizing audio data for the user.

As an illustrative example, when the conditions are perceived to be noisy (e.g. due to a virtual wind blowing through the environment or a virtual rain or sleet hitting a window in the environment) the processor 102 may determine the audio characteristics of the audio data heard by a user in response to the object properties of the virtual source, further object properties of other objects (real or virtual) in the environment and the environment properties, and instruct the audio controller 112 to control the audio output device 118 to generate audio data having particular audio characteristics for the user, such that the user experiences the ringing telephone as affected by the object properties and/or environment properties.

Continuing the illustrative example of the virtual telephone, when a virtual wind is perceived to be blowing towards or away from the user, the audio characteristics of the perceived audio data emitted by the virtual telephone may be changed accordingly.

Thus, in embodiments, the apparatus determines the object properties of one or more objects (real and/or virtual) of an environment and/or the environment properties of the environment, and outputs to a user audio data having particular audio characteristics based on or in response to the object properties and/or the environment properties, such that the user experiences, via the audio output device, realistic audio data in the environment.

The object properties and/or environment properties may be determined in any suitable manner. For example, when camera 105 receives or captures an image of a real object, computer vision processing techniques may be used to identify one or more objects and determine the object properties thereof.

Other methods may also be used to derive one or more object properties or environment properties. For example, the apparatus 100 may direct, from an output device, sound data (e.g. audible or ultrasonic soundwaves etc.) or electromagnetic signals (e.g. radio frequency waves etc.) into the environment and determine one or more object properties and/or environment properties from the reflected signals which may be affected (attenuated/amplified) by the objects in the environment or the environment itself. The signals may be emitted into the environment in a targeted manner (e.g., at a particular object), or the signals may be emitted into the environment in a swept, random or pseudorandom manner. For example, audio triangulation using microphones at different locations on the apparatus (or in the environment) may be used to detect one or more object properties and determine the position of the object in the environment, a shape and size of the detected object and/or the sound absorption coefficient of the detected object.

Alternatively, when the object is identified using an identifier (e.g. using a serial number or barcode identified in an image capture by a camera using computer vision techniques) or where the object is identified by another means (e.g. using computer vision processing, Machine Learning, Deep Learning) the apparatus may, using the communication circuitry 104, request the object properties of that object from another resource e.g., from a remote server.

In an illustrative example, the apparatus may only determine the object properties of objects and/or environment properties within a certain area (e.g., within a threshold distance) such that, for example, the audio characteristics of audio data generated for a user are dependent only on the acoustic profile of the environment within that certain area. In a further example the apparatus may obtain the object properties of all objects within the environment, such that the audio characteristics of audio data generated for a user are dependent on the acoustic profile of the environment.

Object properties of real objects previously obtained or determined by the apparatus may be used as object properties for a virtual object rendered by the XR application. In an illustrative example, object properties determined for a real chair (e.g., a metal chair) may be stored in storage 103 on the apparatus and then accessed by the application and used as object properties for a virtual metal chair subsequently rendered by the application. Similarly, environment properties of a real environment may be used as environment properties of a virtual environment or aspect thereof.

In this way, the acoustic profile for the environment may be generated dependent on object properties of the virtual objects as well as object properties of the real objects. Additionally, or alternatively, the acoustic profile for the environment is generated dependent on environment properties of the real and/or virtual aspects of the environment.

As above, various techniques may be used to determine the object properties and/or environment properties in the environment and, once obtained, the apparatus may store the object properties of one or more of the objects and the environment properties in storage 103. The object properties and/or environment properties may be stored in any format. In embodiments the object properties and/or environment properties may be organized in storage so as to be accessed in an efficient manner to determine the acoustic profile of the environment.

In an illustrative example the object properties and/or environment properties are stored in a data structure or array in storage thereon to be accessed in an efficient manner by the application. In an illustrative example, the data structure may comprise a hierarchical octree data structure.

In an illustrative embodiment, the apparatus creates a representation of the environment, where the representation may be a two-dimensional (2D) or three-dimensional (3D) model of the environment, created using inputs from one or more input devices (e.g., camera, microphone, accelerometer, depth sensor etc.). In an illustrative example, the apparatus may use a mapping technique, such as simultaneous localization and mapping (SLAM), to generate a 3D model of the environment from the inputs from the one or more input devices.

The processor may then augment the environment model with information relating to the object properties of the real and virtual objects within the environment and/or environment properties of the environment itself.

As an illustrative example, the processor may partition or divide the 3D-environmental model into a plurality of segments and augment the one or more segments within the environment model with information such as semantic information relating to the object properties and/or environment properties within the environment. As will be appreciated, the granularity of the segments and the level of detail of the information may be dependent on the resources on the apparatus (e.g. power/processing/storage). For example, the 3D model may be further divided (e.g., recursively subdivided) into octants (e.g., in an octree data structure) as required by a particular application.

As an illustrative example the segments may comprise one or more voxels. However, the claims are not limited in this respect and the segments could, additionally or alternatively comprise: one or more pixels (e.g., 3D pixels), a point cloud and/or a mesh.

By augmenting the segments (e.g. the voxels) with semantic information relating to the object properties and/or environment properties within the environment, the processor may, when determining the audio characteristics of the audio data to be generated for the user, retrieve and use the semantic information for the one or more voxels to determine acoustic profile of the environment.

The processor may then instruct the audio controller 112 to control the audio output device 118 to generate or synthesize audio data having the audio characteristics corresponding to, for example, a virtual sound source in the environment in accordance with the acoustic profile, such that the user experiences a realistic audio experience in accordance with the virtual source in the environment.

Figure 2A:
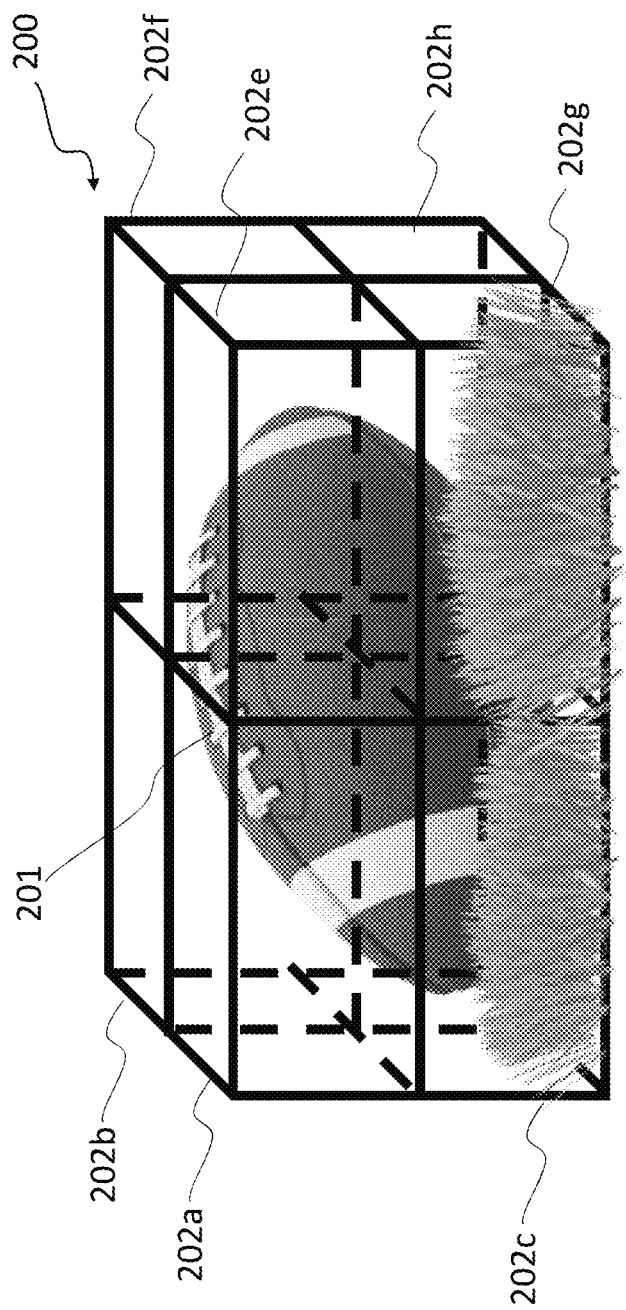
FIG. 2a schematically shows a plurality of voxels of an environment model of an XR application according to an embodiment.
Figure 2B:
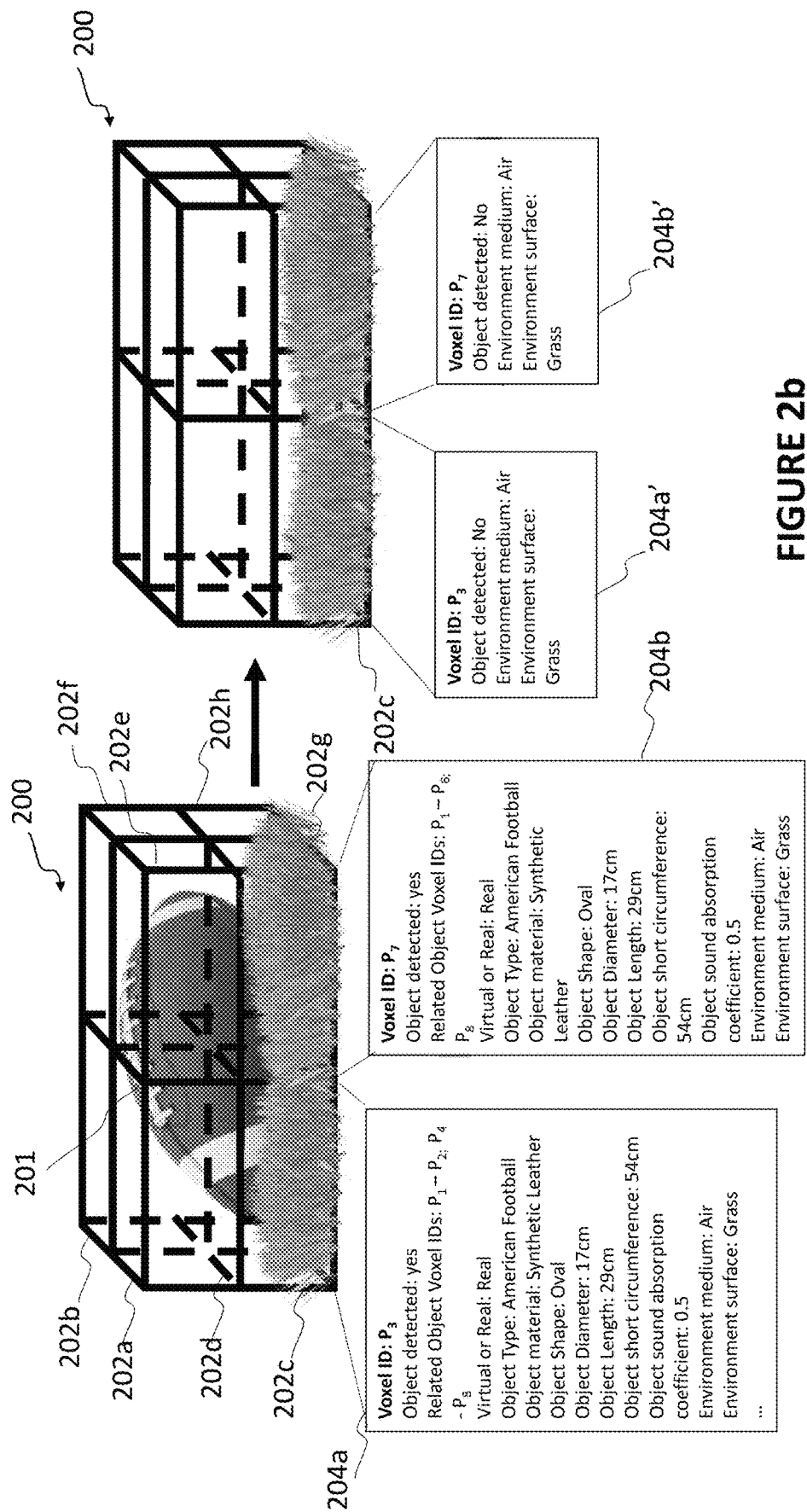
FIG. 2b schematically shows the plurality of voxels of FIG. 2a according to a further embodiment.

FIGS. 2a and 2b show illustrative examples of a voxel array 200. Voxel array 200 comprises 8 voxels (202a-202h) and, in the present illustrative example, is a portion or subset of voxels of a 3D environment model. Such an environment model may have thousands, millions, billions, trillions etc. of voxels dependent on the size of the environment and granularity of the voxels. The environment model may be created using a mapping technique as discussed above.

In FIG. 2a, a real object 201 is detected as intersecting voxels 202a-202h. The real object in the present illustrative example is depicted to be an American football, but the real object may be any object and is not limited to being an American football.

When the real object 201, is detected its object properties may be determined using, for example, an approach described above. In some embodiments the apparatus may use artificial Intelligence techniques, such as machine learning techniques, to determine object properties and/or environment properties.

In an alternative example, computer vision processing techniques may be used to detect an identifier (e.g., a serial no. or barcode no.) and the apparatus may obtain the object properties from another resource (e.g., the manufacturer's servers) using the identifier.

Each voxel 202a-202h in the array 200 which the real object intersects may be augmented with the semantic information relating to the determined (or obtained) object properties. Example semantic information is shown in data structures 204a and 204b (on FIG. 2b), although these are exemplary examples of data structures, and any object properties and/or environment properties may be included.

The voxels may, additionally or alternatively, be augmented with the semantic information relating to the determined (or obtained) environment properties of the environment which intersects the voxels. For example, in FIG. 2a the environment medium in the voxels 202a-202h in which the real object is located is determined to be air, whilst the environment surface for voxels 202c, 202d, 202g and 202h is determined to be grass.

In embodiments, the semantic information may also indicate which voxels the real object intersects so that the apparatus is not required to parse the semantic information in all voxels. In the present illustrative example, for Voxel $P_1$ the "Related Object Voxel ID" indicates that the real object intersects voxels $P_2$ to $P_8$ so the apparatus may not parse the semantic information in those voxels when determining the acoustic profile for the environment, thereby reducing the processing requirements.

The semantic information for the voxels may be dynamically updated by the apparatus continuously monitoring the environment and when an object at a particular location or is determined to have moved or replaced by another object, the semantic information for that location in the environment is updated. When the object no longer intersects a particular voxel in the model, the semantic information for that particular voxel is augmented with semantic information relating to the newly detected object properties or environment properties of the objects/environment within that particular voxel.

Continuing the illustrative example of FIG. 2a, FIG. 2b depicts real object 201 no longer intersects voxels 202a-202h, whereby it may have been kicked by a virtual character, such that the application hides the real object from the user (e.g. by covering the real object with a virtual object) and rendering a corresponding virtual American football moving through the environment in accordance with the trajectory of the kick.

The semantic information for the voxels 202a-202h may be updated in accordance with the newly detected object properties and/or environment properties (i.e., showing no football). Example updated semantic information is shown in data structures 204a' and 204b' although these are exemplary examples only, and any object properties and/or environment properties may be included.

Furthermore, as the (now) virtual object moves through the environment, the semantic information of the voxels through which the virtual object is detected to move may be dynamically updated. In the present illustrative example, the object properties of the real American football may be used as the object properties for the virtual American football, and the semantic information of the voxels through which the virtual American football moves being updated with those object properties.

Alternatively, the semantic information of voxels through which an object is moving may not be updated, and only the semantic information of voxels in which an object is located for a threshold time is updated. Such functionality may reduce the processing/storage burden of the apparatus as the semantic information of voxels through which an object is transitioning for a relatively short time are not updated.

In embodiments, augmenting the segments of a partitioned array may be efficient because empty segments can be described using only coarse or minimal information in comparison to segments in which there is an object; and segments sharing the same object/environment properties can share the information for the shared objects.

To simulate the noise of the virtual character kicking the real football for the user, the processor may retrieve the semantic information (e.g. object properties and/or environment properties) for each voxel 202a-202h to determine the acoustic profile of the environment at the time the ball was kicked, and instruct the audio controller 112 to control the audio output device 118 to generate or synthesize audio data having particular audio characteristics for the user in accordance with the acoustic profile for the environment.

The acoustic profile of the environment, and therefore the audio characteristics of the audio data which the user hears may also be influenced by the object properties and/or environment properties of other voxels in the environment.

For example, the audio characteristics of the audio data which the user hears may be affected by the object properties assigned to the virtual character (e.g., the type, size and material of the football boots, weight, height etc.). The audio characteristics of the sound of the kick may also be affected by the environment properties of the voxels through which the virtual character moves before striking the ball (e.g., the surface type through which the virtual character moving).

Furthermore, the object properties and environment properties of other objects in the environment and the environment itself may also be taken into account by the processor when the determining the audio characteristics of the audio data which the user should hear. For example, the audio characteristics of the sound of the kick may also be affected by the speed and direction of a virtual wind in the environment.

Thus, when determining the audio characteristics of audio data output to a user, the processor takes into account the acoustic profile of the environment which is dependent of the one or more object properties of the real and virtual object and/or one or more environment properties.

As will be appreciated, the granularity (e.g., no. of voxels/size of the voxels) of the array 200 depicted in FIGS. 2a and 2b is provided for illustrative purposes only, and the granularity may be increased or decreased as required for a particular application or dependent on the available resources (processing, power etc.). Furthermore, the dimensions (height, width, depth) of each voxel in FIGS. 2a and 2b are provided for illustrative purposes only, and the voxels may be any dimension as required for a particular application.

Figure 3:
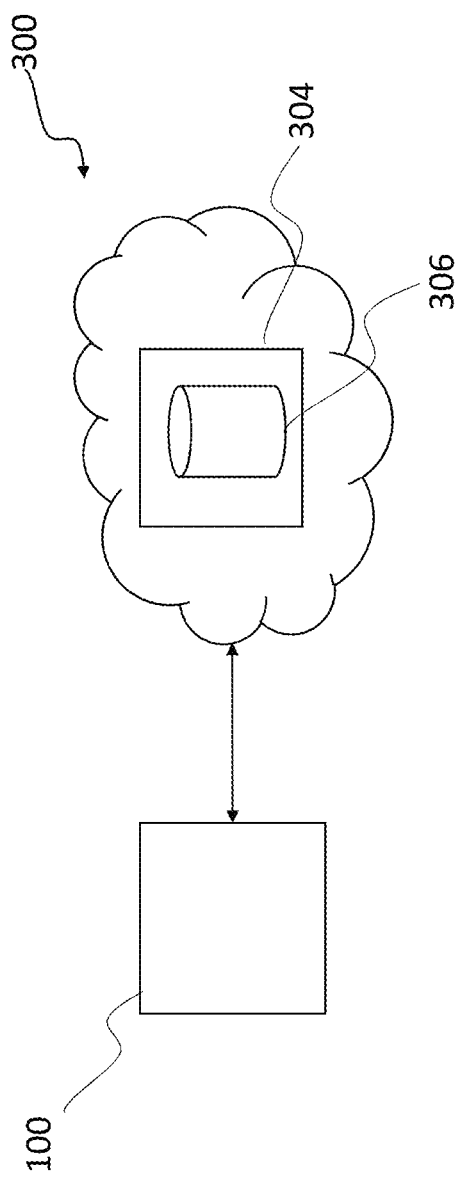
FIG. 3 schematically shows a system comprising an XR apparatus according to an embodiment.

FIG. 3 schematically shows a system 300 comprising XR apparatus 100. XR apparatus is substantially similar to XR apparatus 100 of FIG. 1.

XR apparatus 100 communicates with resource 304, which may comprise a plurality of interconnected computing devices (or software running on a plurality of interconnected devices), whereby the plurality of interconnected computing devices may be distributed over one or more networks. which provides one or more services.

The apparatus 100 may communicate directly or indirectly with the resource 304 (e.g., via one or more router and/or more or more computing devices in the same or different networks). In FIG. 3 resource 304 is depicted as a web server hosted on a cloud network, but the claims are not limited in this respect and the resource 304 may, for example, be a single computing device or software running on a computing device in wired or wireless communication with apparatus 304. Resource 304 may provide service(s) for the apparatus 100, whereby the service(s) may include one or more of: web service(s); data storage service(s); analytics service(s), management service(s) and application service(s), although this list is not exhaustive For example, the apparatus 100 may send the sensed data to the resource 304 for processing and/or storage, which may offload the processing and/or storage burden to the resource 304. For example, the apparatus 100 may provide the data from the input devices thereon to the resource 304 to determine the object properties and/or environment properties therefrom. When processing is complete the resource 304 may send the object properties and/or environment properties to the apparatus 100 for storage thereon. Such functionality means that the apparatus can offload a portion of the processing to determine object/environment properties to the resource 304.

In an illustrative example, when object properties and/or environment properties have been determined for an environment, the apparatus 100 may store on local storage thereon (or send to a resource) the determined data. When the apparatus is restarted and the environment model initialized, the apparatus may retrieve some or all of the stored data from the local storage and augment an environment model with information relating to the object properties or environment properties of the objects/environment within the environment model, thereby negating the need to redetermine the information each time the application is initialized.

In a further illustrative example, when a user of an XR application leaves an environment, some or all of the information used to obtain the acoustic profile for that environment (e.g. object/environment properties) may be moved from a first memory (e.g. cache) to a less important memory (e.g. a local non-volatile storage), which reduces in the storage burden on the first memory. When the user subsequently returns to the environment (or when it is determined that the user will return to the environment), the XR application may restore the information for some or all of the environment to the cache for use by the XR application for more efficient accessibility.

Additionally, or alternatively, the resource 304 may maintain a database 306 of object properties of different objects. When an apparatus determines that a particular object is detected during an XR application, the apparatus 100 may request the object properties of that object from the resource 304. For example, the apparatus 100 may obtain, e.g., from computer vision processing techniques, an identifier (e.g., barcode, QR code) for a particular object in the environment. The apparatus may then request the object properties of that object from the resource 304, and when received, use the object properties of that object in the acoustic profile of the environment.

Similarly, the resource 304 may also maintain a database 306 of environment properties, and then send the environment properties to the apparatus.

Thus, the resource 304 can store object properties of multiple objects and/or environments and provide the object properties and/or environment properties to one or more apparatuses when required by an XR application. Such functionality reduces the processing burden on an apparatus in comparison to the apparatus having to perform processing to determine the object properties and/or the environment properties itself.

Figure 4:
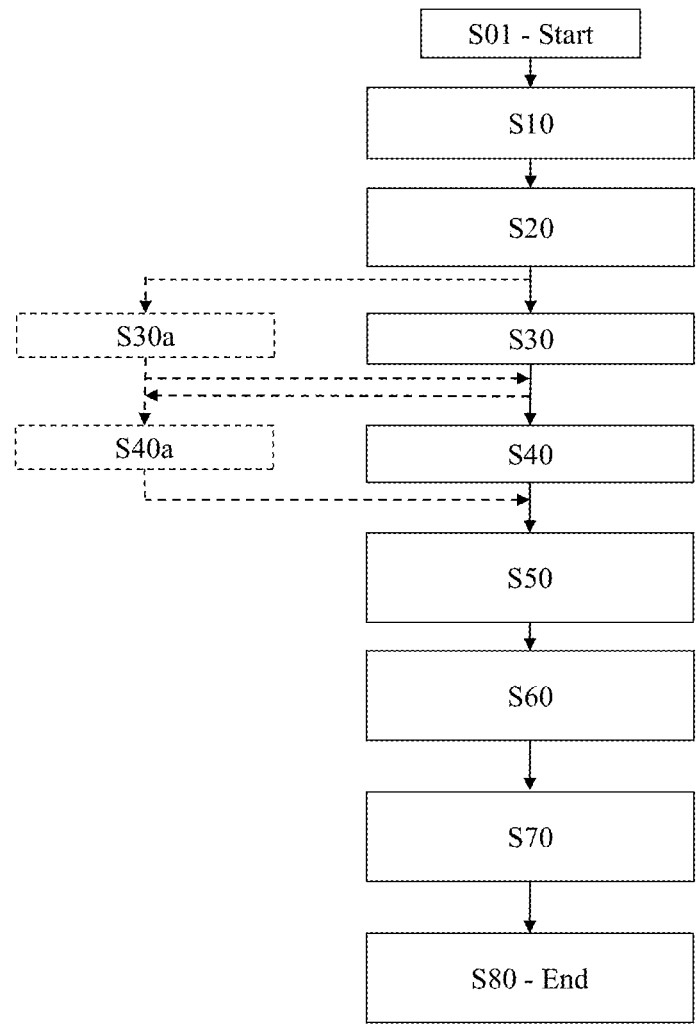
FIG. 4 shows a flow diagram according to an embodiment.

FIG. 4 is a flow diagram of a process 001 for obtaining object properties and/or environment properties for an XR application according to an embodiment. The process 001 starts at S01.

At S10, a user initializes the XR application on an XR apparatus.

At S20, the XR apparatus scans an environment in which the user is located. The environment may be a real environment which the user can see through a transparent or semi-transparent display screen between the user's eyes and the real environment.

At S30, the XR apparatus determines the object properties of one or more real objects in the environment. For example, the object properties may be determined based on or in response to the apparatus capturing one or more images (or image and depth) in the environment and performing computer vision processing techniques to derive the object properties.

Additionally, or alternatively, input(s) from one or more input devices other than a camera, such as a microphone, accelerometer or gyroscope, may be used as a source(s) for determining object properties. For example, audio triangulation using microphones at different locations on the apparatus or in the environment may be used to determine the position, size or acoustic properties of objects in the environment.

As an addition or as an alternative to S30, at S30a the XR apparatus may obtain some or all of the object properties from a remote resource (e.g., a cloud service). Such functionality means that the processing requirements to obtain the object properties may be reduced in comparison to performing all processing at the XR apparatus itself.

At S40, the XR apparatus determines the environment properties of the environment. For example, the environment properties may be determined based on or in response to the apparatus capturing one or more images in the environment and performing computer vision processing techniques to derive the environment properties. Additionally, or alternatively, input(s) from one or more input devices other than a camera, such as a microphone, may be used as a source(s) for determining environment properties.

As an addition or as an alternative to S40, at S40a the XR apparatus may obtain some or all of the environment properties from a remote resource (e.g., a cloud service). Such functionality means that the processing requirements to obtain the environment properties may be reduced in comparison to performing all processing at the XR apparatus itself.

At S50, when a virtual source is rendered in the environment (e.g., a virtual ringing telephone or virtual ringing alarm clock), the apparatus determines, based on or in response to the object properties in the environment and/or environment properties, the acoustic profile of the real environment. As will be appreciated the virtual source may be rendered in accordance with the requirements of the XR application. In some embodiments it may not be visible to a user of the apparatus. For example, it may be fully or partially obscured or may be rendered so as to be located behind the user.

At S60 the processor instructs the audio controller to synthesize audio data having audio characteristics corresponding to the audio data from the virtual source in accordance with the acoustic profile.

At S70, the audio controller controls the audio output device to output the synthesized audio data for the user, such that the user experiences a realistic audio experience during the XR application.

The process 001 ends at S80.

Figure 5:
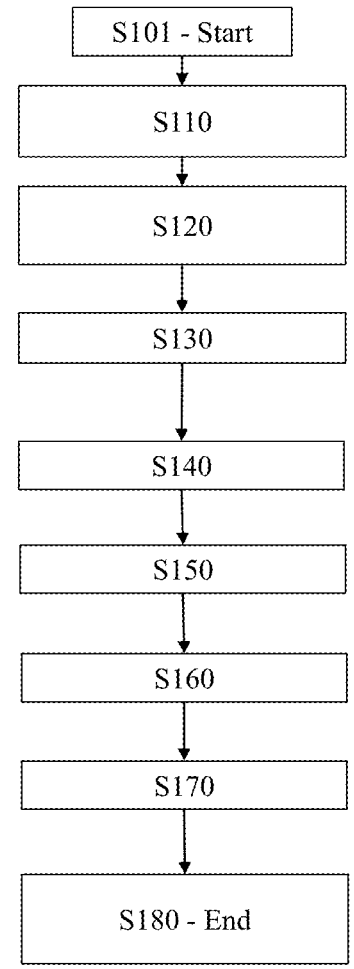
FIG. 5 shows a flow diagram according to an embodiment.

FIG. 5 shows a flow diagram of an example process 101 to create an environment model. At S101 the process starts.

At S110 the user initializes an XR application in an environment.

At S120 the apparatus creates, using inputs from one or more input devices, a representation of the environment, where the representation may be a two-dimensional (2D) or three-dimensional (3D) model of the environment. The apparatus may use a mapping technique, such as simultaneous localization and mapping (SLAM), to generate the model of the environment.

At S130 the processor divides the 3D-environmental model into a plurality of voxels. The granularity of the voxels may be dependent on the resources (e.g., power/processing/storage).

At S140 the processor augments one or more voxels of the environment model with information relating to the object properties or environment properties of the real and/or virtual objects/environment within the environment. Such object properties or environment properties may be determined in accordance with the process of FIG. 4.

At S150 during the XR application, the processor retrieves and uses the semantic information to determine an acoustic profile of the environment, where the acoustic profile is dependent on some or all of the object properties and/or some or all of the environment properties of the environment.

At S160 the processor, in response to virtual sources of audio data in the XR application (e.g., virtual-to-real interactions or virtual-to-virtual interactions), instructs the audio controller to synthesize audio data having audio characteristics corresponding to the sound from the virtual source in accordance with the acoustic profile.

At S170, the audio controller controls the audio output device to output the synthesized audio data for the user, such that the user experiences a realistic audio experience during the XR application.

At S180 the process 101 ends.

The apparatus may use various techniques to determine the object properties of one or more objects in the environment or environment properties.

As described above, computer vision processing techniques may be used to model an environment and/or determine the object properties or the environment properties from one or more images captured by a camera input device on the apparatus. However, the claims are not limited in this response and other techniques may also be used.

For example, data from other input devices (depth sensor(s), microphone(s), accelerometer(s), gyroscope(s)) may also be used to model an environment and/or determine object properties and/or environment properties.

Figure 6:
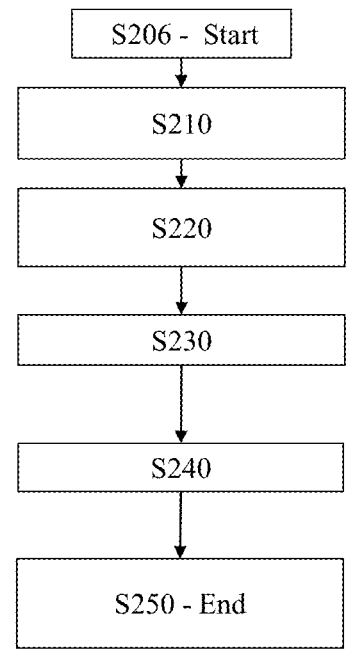
FIG. 6 shows a flow diagram according to an embodiment.

FIG. 6 shows a flow diagram of an example process 206 to determine object properties. At S206 the process starts.

At S210, XR apparatus may actively emit audio data (e.g., one or more sounds) into the environment using an output device (e.g., an audio output device such as a speaker). The audio data emitted into the environment may be in the audible frequency range for the user (e.g., –20 Hz (Hertz) to –20 kHz). Alternatively, the audio data emitted into the environment may be in the inaudible frequency range e.g., ultrasonic range (>20 kHz). The audio data may be emitted in a targeted manner so that it is targeted at a particular object in the environment or the audio data may be swept around the environment.

At S220, audio data comprising audio data reflected from one or more objects in the environment and/or the environment itself are received or captured by one or more microphones.

At S230, the received or captured audio data is analyzed and, based on or in response to the analysis, the object properties and/or environment properties are determined. An environment model may then be created and/or augmented with information relating to the object properties or environment properties of the objects/environment.

Additionally, or alternatively, object properties and/or environment properties that have already been determined by the apparatus (e.g., using computer vision processing techniques) may be refined or updated in accordance with the object properties and/or environment properties.

At S240 the apparatus determines, based on or in response to the object properties and/or environment properties, the audio characteristics of the audio data output to the user.

At S250 the process 206 ends.

Although inaudible sounds >20 kHz may be affected by objects/the environment differently to those in the audible frequency range, the behavior of a particular object within one frequency range (e.g., how it absorbs/reflects sounds) can be derived from behavior of that particular object within a different frequency range. For example, machine learning may be used to analyses the object properties and/or environment properties to determine how audio data would behave given an ultrasonic source (e.g., how soundwaves would propagate). Thus, the process to create an environment model and/or to determine or refine object properties/environment properties can be performed in an inaudible range for a user meaning the user will not be distracted by different sounds emitted during the process 206. Such functionality also means that the process 206 can be performed whilst the user is interacting/moving around the environment without becoming distracted by sounds.

Although the process 200 describes the apparatus actively emitting audio data into the environment using an output device to determine the object properties and/or environment properties from the subsequently detected audio data, the claims are not limited in this respect, and the apparatus may determine the object properties and/or environment properties from passive sounds occurring in the environment (i.e. sounds which do not result from the apparatus actively emitting audio data into the environment).

In embodiments, the apparatus may perform one or more audio data verification techniques to determine, for example, whether or not the audio characteristics of the audio data which a user hears correspond to what the user actually experiences in the environment. On performing the verification techniques, the apparatus may optimize the audio characteristics of the audio data generated for the user to improve the user experience.

In embodiments, the object properties and/or environment properties may be determined based on or in response to user actions and/or real-to-real interactions. For example, the user may be instructed by the apparatus to perform specific actions with a real object (e.g., via instructions on the screen or audio instructions), whereby the audio data resulting from the user actions or real-to-real interactions may be used by the apparatus to determine object properties and/or environment properties.

Figure 7:
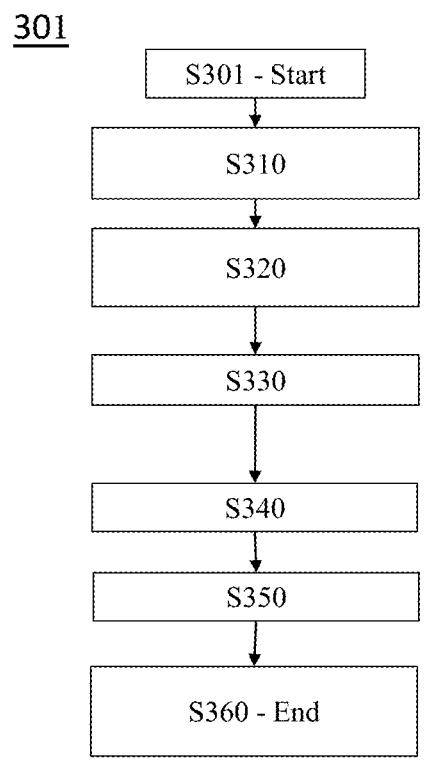
FIG. 7 shows a flow diagram according to an embodiment.

FIG. 7 shows a flow diagram of an example process 301 to determine properties.

At S301, the process 301 starts.

At S310 a real-to-real interaction occurs in an environment. The real-to-real interaction may be caused by a user, for example, throwing a first real object (e.g., a rubber ball) against a second real object (e.g., a wooden door) or by dragging a real metal chair across a tiled floor in an environment.

At S320 sensed data from the real-to-real interaction is captured by one or more devices (e.g., a camera, a microphone, a depth sensor on the apparatus).

At S330 the apparatus determines, based on or in response to the sensed data, object properties and/or environment properties of one or more objects in the environment and/or environment properties.

For example, the apparatus may determine, from the audio characteristics of the audio data resulting from the ball bouncing against the door, that the ball is made of a particular material (rubber in this instance) and that the door is made of a particular material (wood in this instance). In a further illustrative example, the apparatus may determine from the audio characteristics of the audio data resulting from the chair being dragged across the floor, that the chair is made of a particular material (metal in this instance) and that the floor is made of a particular material (tiles in this instance). In a further illustrative example, the size and shape of the ball may be determined from image data, whilst inputs received at one or more microphones may inform the material and/or acoustic properties for the floor, chair etc.

At S340 the apparatus stores the determined object properties and/or environment properties. For example, the apparatus may update semantic information for the environment with the object properties and/or environment properties determined at S330.

At S350 the apparatus uses the semantic information to generate the audio characteristics of audio data output to the user when using an XR application. For example, the apparatus may render a virtual ball as part of an XR application and assign the object properties determined for a real ball to the virtual ball, such that the audio data generated for the virtual ball in the XR application are dependent on the assigned object properties.

At S360 process 301 ends.

In a further example, a user may be looking at a real pianist at a concert environment (e.g., on a stage). As part of an XR application, the apparatus may render a virtual violinist as a virtual source at another location in the environment (e.g., at an opposite side of the stage). The apparatus may retrieve semantic information (e.g. object properties and/or environment properties) determine the acoustic profile of the environment substantially as described above, and instruct the audio controller to control the audio output device to generate or synthesize audio data having particular audio characteristics for the user in accordance with the acoustic profile for the environment such that the user hears the real piano and virtual violin (and other real or virtual instruments) as the user would expect.

Figure 8:
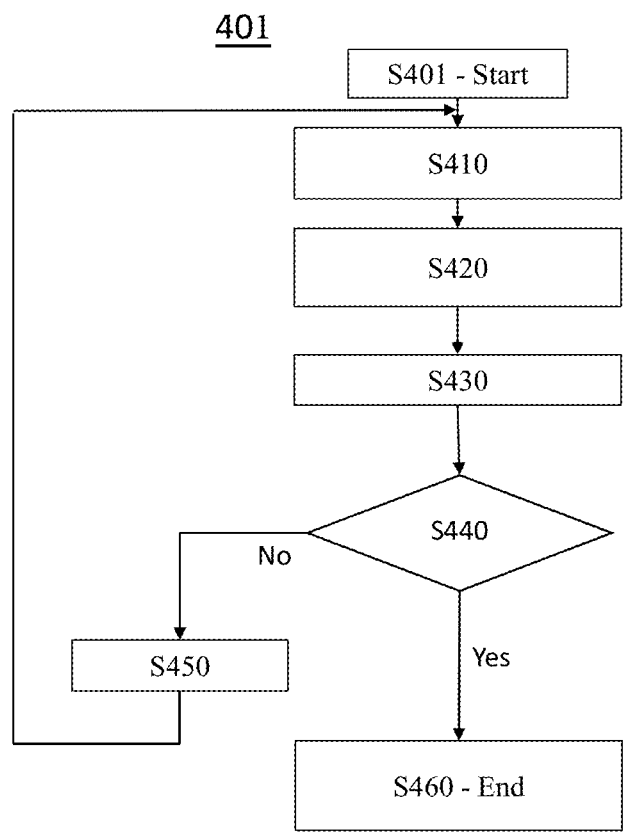
FIG. 8 shows a flow diagram according to an embodiment.

FIG. 8 shows a flow diagram of an example process 401 to determine whether or not the audio characteristics of audio data generated to represent virtual sources of sound in an environment (e.g. a virtual-to-real or virtual-to-virtual interaction) correspond to the actual virtual objects rendered for the user on screen and whether or not the audio characteristics of the audio data a user hears correspond to expected audio data from the virtual source.

At S401 the process 401 starts.

At S410, the XR application initiates a virtual source of audio data in the environment (e.g., by rendering one or more virtual-to-real or virtual-to-virtual interactions on a display screen).

At S420, the XR apparatus synthesizes one or more audio data corresponding to the virtual source, and outputs the audio data for the user e.g., to be output from one or more audio output devices.

At S430, the XR apparatus monitors, using an input device, the user's reaction to the output audio data, where the input device, may comprise, a camera, microphone, accelerometer, gyroscope or a user interface (e.g. one or more input buttons).

At S440, the XR apparatus determines whether the user's reaction to the audio data is an expected reaction or an unexpected reaction. For example, the XR apparatus may receive or capture images of the user and use computer vision processing techniques to monitor the user's facial expression in response to the audio data, whereby when the user's facial expression is determined to be an unexpected facial expression (e.g. an expression, such as surprise, rather than a different expected facial expression, such as happiness) then the apparatus may determine that the audio characteristics of the audio data are incorrect.

In a further example, the XR apparatus may determine that the user's reaction to the audio data is an unexpected reaction when the user looks to a position other than an expected position in the environment (e.g., by monitoring eye movement, or head rotation). Using such functionality, the apparatus can determine whether the virtual source is rendered correctly in the environment. For example, when a virtual-to-virtual interaction (e.g., a clash of virtual swords) is generated to occur at a first position in the environment, the apparatus would expect the user to look at the first position when the user hears the audio data generated for that interaction. However, when it is determined that the user looks at the different position it can be determined that the apparent location of the interaction for which the audio data was generated was incorrect and remedial action taken. Such remedial action may be to adjust the HRTF for the user. Such remedial action may also include having the user perform calibration techniques such as rescanning the environment to identify all objects and to determine the object properties/environment properties and/or reconfirming the user's position in the environment.

As a further example, the user may, using an input device, convey to the apparatus that the audio characteristics of the generated audio data are incorrect. In an illustrative example the user may say a phrase such as "unexpected sound" which may be detected via the microphone, or the user may use a button (e.g. on a keypad) to convey to the apparatus that the audio data was unexpected and for remedial action to be taken.

When the user's reaction is determined to be unexpected or the user conveys to the apparatus that the audio data is not as expected (No), the apparatus, at S450, takes remedial action. The apparatus may then then restart the verification process to determine whether or not the audio characteristics of audio data generated to represent a virtual-to-real or virtual-to-virtual interaction correspond to the interaction.

When the user's reaction is determined to be correct (Yes), the process ends at S460.

The embodiments described above provide a realistic audio experience for a user, where a user in a real or virtual environment will experience audio data having audio characteristics generated based on or in response to the object properties of some or all objects (real and/or virtual) and/or environment properties of the environment to provide a realistic audio experience for the user.

Thus, a user of an XR application will experience audio data from virtual-to-virtual and virtual-to-real interactions in a realistic manner and provide an immersive experience.

The apparatus can also use the object properties and/or environment properties to synthesize audio data resulting from real-to-real interactions which are captured by one or more input devices (e.g., a camera, microphone etc.).

In an illustrative embodiment, a user may have reduced hearing or a user that may be using noise-cancelling headphones in a real environment, such that the apparatus may, on detecting a real-to-real interaction which the user cannot otherwise hear (e.g. a clash of real swords), synthesize audio data for the user having audio characteristics based on or in response to the object properties and the environment properties to simulate real sounds resulting from real-to-real interactions.

Thus, even though the user may be in the same room as the clashing real swords, the noise cancelling headphones will block the noise or the user may have hearing loss and will otherwise not hear the real sound, but the apparatus will nonetheless synthesize the audio data to provide a realistic audio experience for the user via, for example, noise cancelling headphones or cochlear implants.

Thus, in embodiments both real and virtual sounds are generated by the system, whereby both the generated real and generated virtual sounds may be mixed in the virtual environmental environment.

The functionality described above provides for an apparatus to obtain an acoustic profile for an environment in which a user is located, and to generate or synthesize audio data having particular audio characteristics for the user in accordance with the acoustic profile. As described above, the acoustic profile of the environment results from object properties of object(s) in the environment and/or the environment properties of the environment itself.

As will be appreciated by one skilled in the art, the present techniques may be embodied as an apparatus, system, method, or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. The computer readable storage medium may be a non-transitory computer readable storage medium encoded with instructions that, when performed by a processing means, cause performance of the method described above. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object, or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods, or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

As will also be appreciated from the foregoing specification, a non-transitory computer-readable storage medium is provided, comprising executable instructions thereon which, if executed by a processor, cause the processor to carry out any methods described above.

In one embodiment, an apparatus to generate audio data for a user is provided, the apparatus comprising: an input device to receive one or more inputs derived from an environment in which the user is located; and a processor configured to obtain an acoustic profile for the environment based on or in response to the one or more inputs; synthesize audio data having audio characteristics corresponding to a sound source in the environment in accordance with the acoustic profile; and output the synthesized audio data to the user.

In embodiments the synthesized audio data appears to the user as though it were located as a specific location in the environment, such as a position of a virtual sound source. For example, an audio controller may use one or more head-related transfer functions (HRTF) for one or more of the user's ears when processing the audio data output for use by the user. In embodiments an audio output device is provided to output audio data to the user.

Furthermore, and as described above, in embodiments the apparatus 100 may share processing with another apparatus. For example, the apparatus may be communicatively couplable to a separate computer (not shown) which accepts data from the apparatus 100, carries out a portion of the processing (e.g., obtaining the acoustic profile or synthesizing audio data) on its own hardware, and passes the processed data to the apparatus perform a portion of the processing.

In another embodiment, the processor is configured to obtain one or more object properties of a real or virtual object in the environment based on the one or more inputs and where the acoustic profile is dependent on the one or more determined object properties.

In another embodiment, the processor is configured to obtain one or more environment properties of the environment based on the one or more inputs and where the acoustic profile is dependent on the one or more environment properties.

In another embodiment, the processor is configured to: create an environment model of the environment using the one or more inputs; divide the environment model into one or more segments; augment the one or more segments within the environment model with information to enable the apparatus to obtain the acoustic profile.

In another embodiment, the information to enable the apparatus to obtain the acoustic profile comprises one or both of: an object property of a real or virtual object in the environment and an environment property.

In another embodiment, the environment model comprises one of: a two-dimensional and three-dimensional model of the environment.

In another embodiment, the input data comprises one or more images and where the apparatus is to identify, based on or in response to the one or more images, one or more objects and determine the object properties thereof.

In another embodiment, the input data comprises one or more sound signals or electromagnetic signals and where the apparatus is to identify, from the one or more sound signals or electromagnetic signals, one or more objects and determine the object properties thereof.

In another embodiment, the processor is configured to render a virtual object in the environment, and where the apparatus is to assign one or more object properties to the rendered virtual object.

In another embodiment, the acoustic profile of the environment is dependent on the one or more assigned object properties.

In another embodiment, the processor is configured to emit the one or more sound signals or electromagnetic signals into the environment.

In another embodiment, when the object is identified, the processor is configured to request the object properties of that object from another resource.

In another embodiment, the source is one of a virtual source and a real source.

In another embodiment, the processor is configured to: render a virtual object at a location in the environment, where the virtual object comprises a virtual source of sound; output, for a user, audio data having audio characteristics corresponding to the virtual source at the first location; monitor a reaction of the user to the output audio data to determine whether the user reaction is an expected or unexpected reaction.

In another embodiment, the processor is configured to undertake remedial action when it determined that the user reaction is an unexpected reaction.

In another embodiment, the processor is configured to obtain the one or more object properties from a remote resource.

In another embodiment, the sound source comprises one of a virtual source and a real source.

In another embodiment, the virtual source comprises a virtual-to-real interaction or a virtual-to-virtual interaction.

In another embodiment, the apparatus comprises an extended reality apparatus comprising one of: a virtual reality apparatus; an augmented reality apparatus and a mixed reality apparatus.

In another embodiment, the input device is one or more of: a camera; a microphone, an accelerometer; a gyroscope; an eye tracker device and a depth sensor.

In another embodiment, obtaining the acoustic profile comprises: obtaining the acoustic profile from a remote resource.

In one embodiment, a method of generating audio data for a user in an environment in which the user is located is provided, the method comprising: receiving, at an input device, one or more inputs derived from the environment; obtaining, using a processor, an acoustic profile for the environment based on or in response to the one or more inputs; synthesizing audio data having audio characteristics corresponding to a sound source in the environment in accordance with the acoustic profile; outputting the synthesized audio data for use by the user.

In one embodiment, a non-transitory computer-readable storage medium, storing executable instructions thereon which, when executed by a processor, cause the processor to carry out the method described above.

What is claimed is:

1. An apparatus to generate audio data for a user, comprising:
   an input device to receive one or more inputs derived from an environment in which the user is located; and
   a processor configured to:
      obtain an acoustic profile for the environment based on or in response to the one or more inputs,
      synthesize audio data having audio characteristics corresponding to a sound source in the environment in accordance with the acoustic profile, where the sound source is one of a virtual source and a real source,
      output the synthesized audio data for use by the user,
      render a virtual object at a location in the environment, where the virtual object comprises a virtual source of sound,
      output, to a user, audio data having audio characteristics corresponding to the virtual source at a first location, and
      monitor a reaction of the user to the output synthesized audio data to determine whether the user reaction is an expected or unexpected reaction.

2. The apparatus of claim 1, where:
   the processor is configured to obtain one or more object properties of a real or virtual object in the environment based on the one or more inputs; and
   the acoustic profile is dependent on the one or more determined object properties.

3. The apparatus of claim 1, where:
   the processor is configured to obtain one or more environment properties of the environment based on the one or more inputs; and
   the acoustic profile is dependent on the one or more environment properties.

4. The apparatus of claim 1, where the processor is configured to:
   create an environment model of the environment using the one or more inputs;
   divide the environment model into one or more segments; and augment the one or more segments within the environment model with information to enable the apparatus to obtain the acoustic profile.

5. The apparatus of claim 4, where the information to enable the processor to obtain the acoustic profile comprises one or both of:
   an object property of a real or virtual object in the environment; and
   an environment property.

6. The apparatus of claim 4, where the environment model comprises one of:
   a two-dimensional model of the environment; and
   a three-dimensional model of the environment.

7. The apparatus of claim 1, where:
   the inputs comprises one or more images; and
   the processor is configured to identify, based on or in response to the one or more images, one or more objects and determine object properties thereof.

8. The apparatus of claim 1, where:
   the inputs comprises one or more sound signals or electromagnetic signals; and
   the processor is configured to identify, from the one or more sound signals or electromagnetic signals, one or more objects and determine object properties thereof.

9. The apparatus of claim 8, where the processor is configured to emit the one or more sound signals or electromagnetic signals into the environment.

10. The apparatus of claim 1, where, when an object is identified, the processor is configured to request object properties of the object from another resource.

11. The apparatus of claim 1, wherein the processor is configured to undertake remedial action when it is determined that the user reaction is an unexpected reaction.

12. The apparatus of claim 2, where the processor is configured to obtain the one or more object properties from a remote resource.

13. The apparatus of claim 1, where the sound source comprises one of a virtual source and a real source.

14. The apparatus of claim 13, where the virtual source comprises a virtual-to-real interaction or a virtual-to-virtual interaction.

15. The apparatus of claim 1, where the apparatus comprises an extended reality apparatus comprising one of:
   a virtual reality apparatus;
   an augmented reality apparatus; and
   a mixed reality apparatus.

16. The apparatus of claim 1, wherein the input device includes one or more of a camera, a microphone, an accelerometer, a gyroscope, an eye tracker device, and a depth sensor.

17. A method of generating sounds for a user in an environment in which the user is located, the method comprising:
   receiving, at an input device, one or more inputs derived from the environment;
   obtaining, using a processor, an acoustic profile for the environment based on or in response to the one or more inputs;
   synthesizing audio data having audio characteristics corresponding to a sound source in the environment in accordance with the acoustic profile, where the sound source is one of a virtual source and a real source;
   outputting the synthesized audio data to the user;
   render a virtual object at a location in the environment, where the virtual object comprises a virtual source of sound;
   output, to a user, audio data having audio characteristics corresponding to the virtual source at a first location; and
   monitor a reaction of the user to the output synthesized audio data to determine whether the user reaction is an expected or unexpected reaction.

18. A non-transitory computer-readable storage medium, storing executable instructions thereon which, when executed by a processor, cause the processor to carry out the method of claim 17.

* * * * *